Oct. 10, 1961  B. S. BRYANT  3,003,204
CORRUGATED WOOD LAMINATE AND PROCESS
Filed Jan. 27, 1956  3 Sheets-Sheet 1

BENJAMIN S. BRYANT
*INVENTOR.*
BY *Smith & Tuck*

FIG. 4

| | VENEER SPECIMEN 1/8"X 4"X 7" | GRAIN ORIENTED TO 6"SPAN | MAXIMIM FIBER STRESS IN BENDING IN P.S.I. (f) | MODULUS OF ELASTICITY IN P.S.I. |
|---|---|---|---|---|
| A | NON-FACED, VENEER THICKNESS = 0.132", 1400 P.S.I.(f) | ACROSS | 1400 | 135,000 |
| B | FACED, SKIN THICKNESS = 0.010", 3650 P.S.I.(f) | ACROSS | 3650 | 436,000 |
| C | NON-FACED, 9350 P.S.I.(f) | PARALLEL | 9350 | 1,250,000 |
| D | FACED, 10,400 P.S.I.(f) | PARALLEL | 10,400 | 1,230,000 |

BENJAMIN S. BRYANT
INVENTOR.

Oct. 10, 1961 B. S. BRYANT 3,003,204
CORRUGATED WOOD LAMINATE AND PROCESS
Filed Jan. 27, 1956 3 Sheets-Sheet 3

BENJAMIN S. BRYANT
*INVENTOR.*

BY Smith + Tuck

United States Patent Office 3,003,204
Patented Oct. 10, 1961

3,003,204
CORRUGATED WOOD LAMINATE AND PROCESS
Benjamin S. Bryant, 8015 Sunnyside, Seattle 5, Wash.
Filed Jan. 27, 1956, Ser. No. 561,843
12 Claims. (Cl. 20—91)

This invention concerns a corrugated wood laminate and process and, more particularly, a corrugated structural laminate made from one or more laminae of wood veneer and faced with a skin material of high tensile strength such as heavy kraft paper. The laminate differs from corrugated plywood in that the grain of the individual veneers is not crossed at right angles as in plywood but is always oriented essentially parallel to the corrugations. The laminate differs from corrugated plywood also in the fact that the outer skin material is an essential component of the construction. The stress-skin not only holds the veneer in the corrugated shape but also is responsible for most of the strength and stiffness across the grain of the wood veneer. The product is made by means of a batch system in a heated press, the plates of which are corrugated, using a special pressing technique.

This application is a continuation-in-part of application Serial No. 311,920, filed by me on September 27, 1952, now abandoned.

Specifically this invention concerns a corrugated, stress-skin laminate, made primarily of wood veneer, possessing unique structural characteristics without the necessity of employing flat faces. The structural efficiency of the laminate arises from the fact that the grain of all the wood veneer lies parallel to the crests and valleys of the corrugations, giving the product high strength properties in the direction of the wood grain; and the skin material, which is pre-stressed (i.e., pretensioned) during the gluing of the skin to veneer, overcomes the poor strength properties of the veneer in the across-the-grain direction, making the laminate remarkably strong and stiff across the axes of the flutings. The tensioning of the skin is produced before the dry veneer, glue, and skin material are permanently welded together under heat and pressure thus: The flat unglued laminae are placed between heated, corrugated dies—or platens—in a press. As the press closes, the friction between the press and the gradually bending veneer, creates a tension stress on the skin material, enabling it to be forced into position for final adhesion while in a state of tensile stress. The veneer, on the other hand, being weak in tension across the grain, tends to crack and stretch in this direction as it is forced to bend between the dies of the closing press. This results in the corrugated veneer having a relatively stress-free condition and being largely dependent on the skin for bending resistance across the grain.

The result of the stress-free condition of the veneer core is to reduce subsequent potential stresses because of moisture changes in the core. It is well known that reduction of internal stresses tends to provide for dimensional stability in wood products.

THE LIMITATIONS OF PLYWOOD

With the increasing shortage of large, old-growth timber available for manufacturing Douglas fir veneers on the Pacific coast, the plywood industry is faced with rising raw materials costs and the challenge of realizing maximum economic recovery from the harvested forest, particularly with respect to its basic product of manufacture—veneer. Veneer in the form of flat plywood has structural limitations which preclude its being used for edgwise compression loads for wall units without reinforcement as by framing studs. And plywood cannot carry loads in bending, as, for example in roof sheathing, when spans are over two feet and the thickness is less than 3/8 inch.

The same bending and compression limitations as for plywood hold true for thin metal sheets. In metal, however, bending strength without an increase in sheet thickness is achieved by corrugating the sheet.

THE PRINCIPLE OF MECHANICS APPLIED TO CORRUGATED CROSS SECTIONS

The art of corrugation has been long recognized as a means by which thin plate materials can be transformed into products of greater load-carrying capacity in bending and compression and as a means by which the stiffness of the product can be increased in the direction of the corrugations. From the point of view of conventional engineering mechanics, this increase in strength and stiffness for the same thickness of material results from an increase in the moment of inertia, "I," which, in the case of the sinusoidal cross section, is a function of the actual thickness of the material, the wave length, and the amplitude of the wave. Thus, when the thickness is increased, the wave length decreased, and the amplitude increased, the moment of inertia, "I," of the cross section becomes greater and consequently the strength in bending and stiffness of the product increase. The basic formula for calculating the moment of inertia, "I," for a generally sinusoidal cross section is:

$$I = \int (rdx)(dr)(r^2 \sin^2 x)$$

where:

$r$—radius to the area $drdx$
$dx$—increment of angle
$dr$—increment of radius
$x$—angle measured from horizontal axis The physical as well as the basic mechanical properties of the material and the method of production used determine the practical limitations of the three factors mentioned.

With materials whose mechanical properties are equal in both directions of the sheet (i.e. hardboard, reinforced sheet plastic, and asbestos-cement board) there are no serious technical problems involved in rolling, pressing, or casting the material into the corrugated shape. Wood veneer, however, is unique in that it is an extremely orthotropic material, i.e. its properties differ greatly depending on the grain orientation. The ratio of its modulus of elasticity, E, parallel to the grain to $E_2$ across to the grain, in dry Douglas fir is in the order of from 10:1 to 20:1; that of its ultimate tensile strength, $T_1$, parallel to the grain to $T_2$ across the grain may be as high as 40:1, and in compression the ratio is about 8:1. The cross-grain lay up of adjacent veneers in plywood overcomes, to some degree, this outstanding disadvantage of wood as an engineering material in flat sheet form. Until now no one has succeeded in combining practically in a single construction the advantageous properties of ordinary wood veneer and the engineering advantages of a corrugated cross-sectional shape.

THE ADVANTAGES AND DISADVANTAGES OF PLYWOOD CONSTRUCTION

Flat plywood cannot be post-formed into practical corrugated shapes because it is stiff and cannot be rendered plastic. By the same token corrugated plywood is difficult to produce through pressing unbonded veneers into a corrugated shape before the glue sets, because extremely thin veneers must be used in those laminae where the grain of the wood lies at right angles to the crests and valleys of the corrugations.

The formula for calculating the minimum radius of curvature for veneers or lumber for purposes of design is:

$$\frac{t}{R} = \text{less than } \frac{1}{125}^1$$

where $t$=veneer thickness and $R$=radius of curvature. Thus the maximum allowable safe thickness of Douglas fir veneer required for bending to a radius of one and one-half inches—as in the design used for illustrating this invention—would be:

$$t = \frac{1}{125} \times 1.5 = 0.012 \text{ inch}$$

Therefore, eleven veneer laminae of equal thickness would be required to make a total thickness of one-eighth inch, and for a three-eighths inch thickness 33 veneer laminae would be required, with small allowance for compression during pressing. Further, the strength and stiffness of the finished laminate in bending and in compression along the corrugations cannot be as great as if all of the grain were running parallel to the corrugations. In the case cited the grain of approximately one-half of the mass of the wood involved would lie at right angles to major stresses, and the strength properties across the grain in wood are much lower as was pointed out. A still further difficulty is that only fine-grain, high quality wood can be peeled or sliced to such thinness and only then on a special type of lathe or slicer.

THE STRESS-SKIN CONCEPT

The principle of stress-skin construction (sometimes called "sandwich construction") has been applied to many sheet materials. Possibly the most familiar example of such construction is plasterboard, i.e. gypsum board, in which a dense but very brittle gypsum-based core (weak in tension in bending) is faced on both surfaces with very heavy kraft paper. The resultant product is stiff and strong in bending. But to trim the sheet it is only necessary to score through one face and apply a bending force toward the opposite side so that the scoring cut is on the tension side of the bent sheet. In other words, when the integrity of the tension face has been destroyed the resistance to bending is lost. Thus, it is demonstrated that the resistance to bending arises from the fact that the faces are able to withstand the concentration of bending stresses in compression and tension. This principle will be illustrated more fully herein.

THE APPLICATION OF THE STRESSED SKIN PRINCIPLE TO VENEER

A most important object of this invention is to employ the principle of stressed skin construction to overcome the mechanical weakness of veneer in the across-the-grain direction, while at the same time incorporating stiffness and substantial strength characteristics derived from the principle of corrugation. I cannot discover that anyone has yet produced a laminate of sheet material wood veneer of ordinary thickness (in the Douglas fir plywood industry from about 1/10 inch to about 3/16 inch), with the grain of all laminae parallel, which embodies the stress-skin principle and which possesses a corrugated cross section having a sufficient section modulus to support practical design loads in bending and compression on spans as great as eight feet, with total laminate thicknesses varying from about one-eighth to about one-half inch. Such a product, as disclosed here, permits orthotropic wood in the sheet form to compete with metals and other isotropic materials for the first time.

Plywood has been made in the form of a corrugated laminate with some structural properties, but the product requires the use of high-grade, extra thin veneers for the reasons indicated above. Such a product cannot be produced by the present U.S. softwood plywood industry because it is not possible to peel commercial species as thin as is required. Further, the use of many thin veneers requires high glue line costs to achieve structural thickness. But primarily the corrugated plywood cannot equal the bending and compression strength of the product of my invention because the grain of approximately half the veneer is at right angles to the direction of primary stresses, whereas in my product all of the veneer is oriented in the direction of intended strength, i.e. parallel to the corrugations.

In the accompanying drawings in which I graphically and schematically illustrate and explain the principles and physical forms of my invention, FIGURE 1 is a perspective view of a beam;

Figure 5:
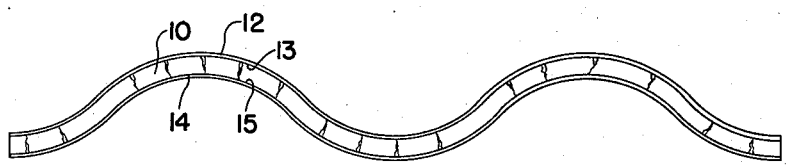
Figure 6:
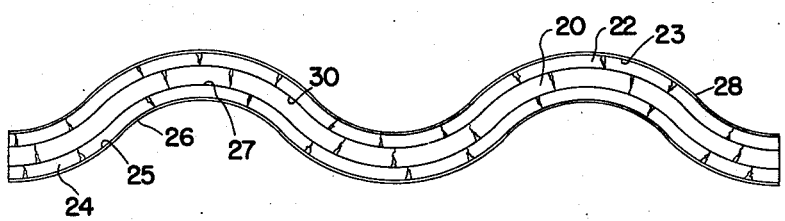
Figure 7:
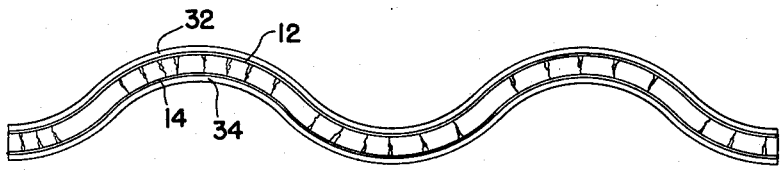

FIGURE 4, a chart in tabular form schematically illustrates in sub views A, B, C and D, the principles and superiority of stress-skin and non-stressed skin construction in simple veneer; and FIGURES 5, 6 and 7 illustrate typical stressed skin corrugated veneer constructions.

GRAPHICAL ILLUSTRATION OF THE STRESS-SKIN PRINCIPLE

The general flexure equation which explains the nature of stresses developed in bending is given by the formula $$f = \frac{My}{I}$$

where:

$f$=the fiber stress in bending (in pounds per square inch) i.e., in compression on the top half of the beam and, equally, in tension in the bottom half of the beam.

$M$=the bending moment in pound-inches.

$y$=the distance from the neutral axis (center of the section in beams of symmetrical cross section). Maximum "$y$," equal to one-half the depth, is usually of interest in calculating maximum fiber stress in the section which is always at the outer surfaces of stress-skin constructions in beams of homogeneous or isotropic material.

$I$=the moment of inertia for the cross section involved.

In the case of rectangular, homogeneous cross sections, $$I = \frac{bd^3}{12}$$

where "$b$" is the width or breadth, and "$d$" is the depth.

Figure 1:
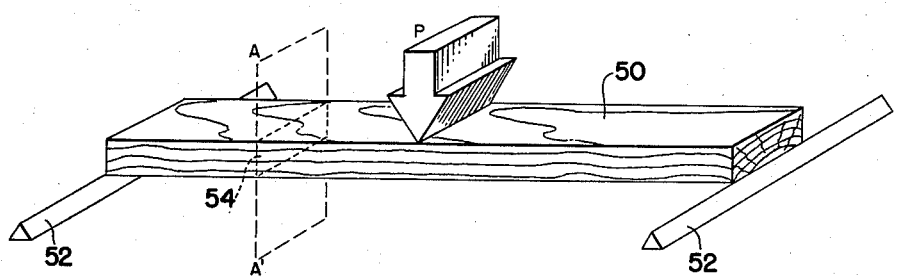

Consider FIGURE 1 where an ordinary rectangular wood beam 50 is supported at its ends by rests 52, 52 and is loaded with a concentration center load, P.

Figure 2:
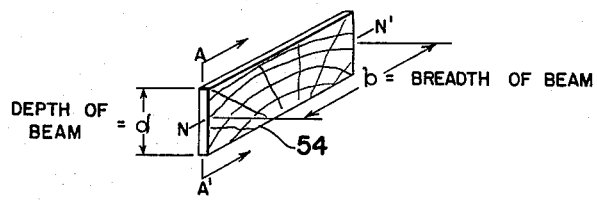
FIGURE 2 is a perspective view of wafer thin cross-section of a beam as removed in the plane A—A¹.

From such a beam a wafer thin cross section may be taken at the cutting plane A—A'. This wafer section 54 is shown in FIGURE 2 enlarged and presented isometrically.

Figure 3:
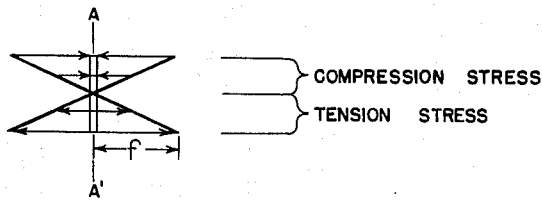
FIGURE 3 is an edge view of the thin, cross-section wafer of FIGURE 2 showing the normal fiber stress conditions.

Since, in this section, the bending moment, M, resulting from load P is constant, and since the moment of inertia, I, remains constant (i.e., $b$ and $d$ are constant throughout length of the beam) it can be seen from the above formula that for any section of the beam $f$ is a direct function of $y$, the distance from the neutral axis. The fiber stress, $f$, expressed as a function of $y$ and graphically superimposed on the wafer section as shown in FIGURE 3.

The ultimate strength in bending (modulus of rup-

---
[1] National Design Specifications, published by the National Lumber Manufacturer's Association, Washington, D.C.

ture) is determined by the maximum fiber stress, either in compression or tension, which the wood can carry at the outer fibers where stress is greatest. For clear dry Douglas fir the average modulus of rupture is 11,600 p.s.i. where the grain of the wood (i.e. its fibers) is parallel to the span direction. When the grain of the wood is oriented across the span direction, however, wood of any species has very little stiffness. In the form of ordinary dry Douglas fir veneer containing deep lathe checks, the strength in bending is so small that across-the-grain strength is usually ignored in engineering calculations applied to plywood constructions.

*Example 1*

To demonstrate the peculiar nature of wood veneer and the contribution to strength and stiffness made by the stressed skin construction, the following experiment was performed: Four pieces of dry Douglas fir veneer, nominally ⅛ inch thick were cut from a single sheet. Their dimensions were 4-inches by 7-inches. Two specimens were cut so that the grain was oriented in the 4-inch direction and at right angles to the 7-inch direction. The other two specimens were cut so that the grain was oriented in the 7-inch direction and at right angles to the 4-inch direction.

One specimen of each pair was faced on both sides with a commercial resin-treated overlay paper which was coated on one side with dried, fusible phenolic-adhesive. The paper used has a thickness range of about 0.016 to 0.017 inch, a basis weight of about 63-pounds per 1000 sq. ft. and a tensile strength of about 100-pounds per inch of width in the machine direction and 65-pounds per inch of width across the machine direction. The paper was pressed onto the wood between heated plates in a press. The plates were at a temperature of 312° F., the time of pressing was 6½ minutes; the pressure used (to avoid compressing the veneer) was 150 p.s.i. for the first three minutes, then 75 p.s.i. for the remainder of the curing cycle.

The specimens were tested in bending by center loading on a 6-inch span according to American Society of Testing Materials procedures using a testing machine which is capable of measuring applied loads to the nearest one-half pound.

A graphical representation of the results and the numerical results, showing the stress distribution through the center section of the specimens, are tabulated in FIGURE 4. The layout of the sketches precedes that of the tabular presentation of the related data. The four parts of the example are designated as sub-views A, B, C and D. Noteworthy is the fact that the presence of the paper skin did not appreciably affect either strength (modulus of rupture) or stiffness (modulus of elasticity) in the specimen with the grain parallel to the span, but the skin had a marked affect on both strength and stiffness when the grain was across the span. See particularly the advantages illustrated in FIGURE 4–B over FIGURE 4–A.

If thin skin material of higher strength and higher stiffness than the veneer is glued securely to both sides of the veneer, the distribution of stresses in the section graphically appears as in FIGURE 4–B with the grain across the span direction. Thus it is seen that since the maximum stress is at the outer fiber, the presence of a high-strength sheet material, as in FIGURE 4–B, on the outer surfaces of a beam materially increases the strength of thin wood sections when the grain of the wood is across the span direction. Such an increase in bending strength and stiffness is largely dependent on the ability of the skin material to absorb a concentration of stresses in both tension and compression and to do so at exactly the points of greatest stress concentration in the wood fibers.

A primary object of this invention is to produce a structural, corrugated laminate of thick wood veneer with stress-skins of high-strength sheet material. The resultant product is stiff and strong along the grain of the wood, both in bending and in pure compression, because of the grain orientation parallel to the corrugations and because of the advantageous section modulus (resistance to bending and deflection) imparted by the deeply corrugated shape. Across the corrugations—and, of course, across the grain of the wood—the product owes its surprising stiffness and strength to the skin in which the bending stresses are concentrated and also to the fact that the skin has been tensioned in the act of laminating the component parts.

Another object of the invention is to produce a useful material at low cost from veneer of a quality and thickness common in the Douglas fir plywood industry. This means the use of dry veneer which has been peeled while in the green condition from logs about eight-feet long mounted in a standard veneer lathe. The thickness of the veneer commonly varies from ⅒ to ³⁄₁₆ inch thick, may contain open defects such as knot holes, and may be deeply checked in the thickness direction as a result of the logs having been peeled in the cold state from coarse-grained wood. Such veneer is normally dried to a moisture content lower than about eight percent (8%). Through patching the defects in the veneer, and by clipping and edge-gluing, the veneer beneath the skin should contain no open defects, as in preferable plywood face veneer. The inner laminae of multiple aligned-grain veneer constructions may contain such defects.

Pressing equipment necessary to produce the corrugated laminate of this invention may be essentially the same as that for the plywood industry except that the platens are corrugated in matching pairs or have corrugated matched dies attached to the platens.

Because of the advantages gained through corrugation and the use of a stress-skin, which can also serve as a protective covering, the cost of framing, erecting and covering walls and roofs can be considerably less than if plywood of the same thickness were used.

A further object of the invention is to laminate the skin material (e.g. paper or metal foil) to the veneer while the former is in a state of tension, the tensile force arising through friction forces applied on the skin as the dies are slowly closed. By using metal foil of low creep properties or a resin impregnated—or sized—paper, it is possible to thoroughly stretch the skin material before the full pressure of the press is engaged on the sandwich. The resultant product is stronger than if the metal or paper faces were preformed into a corrugated shape prior to adhesion in non-stressed condition to corrugated veneer laminae.

In order to practically secure a permanent adhesive bond between the skin and veneer, it is necessary that the following conditions be met: a dry veneer must be interposed between two high-strength facing sheets with a synthetic resin adhesive film being interposed between each veneer face and the adjacent facing sheet face; a heated press; and a pressing time of from about three to ten minutes, depending on the adhesive used and the thickness of the laminate. Temperatures required are in the order of 250° F. to 325° F., depending on the particular adhesive. Pressures from 200 to 100 p.s.i. are adequate.

It is also an object of the invention to provide for a more decorative modification of the basic laminate through the use of thin, decorative hardwood veneers on the faces of the laminate. Such face veneers by no means substitute for the skins of a sheet material. In the veneer-faced decorative form the stress-skins are embedded in the first glue line below the decorative surface veneer and are essential to the product. The decorative skins cannot operate as efficiently as stress-carrying components as in the standard construction previously described, because they do not have the strength characteristics in the cross-the-grain direction necessary to provide stressing advantages. The bending stresses at the level of the outer surface are greatest in any cross section subject to bending.

Aside from the decorative features of the product, natural acoustical advantages can be increased by drilling holes in at least the alternate projections—or crests—of the corrugations.

FIGURE 5, drawn to actual scale, is intended to illustrate in cross-section the simplest, basic construction, viz., one piece of relatively thick dry veneer 10 (in excess of ⅛ inch) surfaced on both faces with pieces of sheet material (paper or metal foil) 12 and 14 which possess high tensile strength. The whole is bonded together with water-resistant adhesive layers 13 and 15. The grain of the wood veneer is parallel to the valleys and crests of the corrugations.

FIGURE 6 represents a typical variation of the construction of FIGURE 5 except that three laminae of veneer are used instead of one. The center lamina 20 may be of lower quality veneer with open defects if it is laminated between two sound, thinner laminae 22 and 24 which will tend to bridge said defects. The skins 26 and 28 function here, as in FIGURE 5 to provide strength and stiffness across the grain of the wood and the corrugations. Glue layers or lines 23 and 25, and 27 and 30 bond the assembly.

In this example core veneer 20 is 3/16-inch thick and its grain direction parallels the corrugations. Veneers 22 and 24 are ⅛-inch thick and provide with skins 26 and 28 an overall thickness of about 7/16-inch. The grain direction of veneers 22 and 24 generally parallel to that of core veneer 20.

FIGURE 7 illustrates a decorative modification of FIGURE 5, in which thin, decorative face veneers 32 and 34 are glued to the skins 12 and 14 in the same manner as before. Such decorative hardwood veneers commonly are available in thickness from 1/16 down to 1/28 inch or even thinner. They differ from Douglas fir veneer in that they are of high quality, rarer woods less subject to cracking when bent due to their thinness, their anatomical structure, and their freedom from lathe or other checks.

To produce the laminate of this invention the component laminae are placed between corrugated dies or platens, as the case may be, of a press heated to about 300° F. The adhesive involved should preferably be of the synthetic thermosetting resin category, although hot press, protein-based adhesives can be used. The simplest form of adhesive application involves the use of a resin-treated heavy cellulosic web or paper of appreciable tensile strength to which a synthetic resin-glue line has been added and the water evaporated therefrom. Thus it is possible in an assembly as shown in FIGURE 5 to have an entirely dry assembly which will produce a waterproof bond after pressing in the neighborhood of 300° F. for a period of about five minutes.

Phenol-formaldehyde, melamine-formaldehyde and urea-formaldehyde resinous films can also be used to permit a dry lay-up operation. In dry lay-ups, the moisture content of the wood veneer should be about eight percent (8%), but where wet glues are used, an optimum moisture condition is more nearly about five percent (5%).

In pressing, the matching corrugated dies—or platens—must close slowly to allow the veneers and sheets of skin material to come together with a maximum amount of tensioning on the skin and a minimum amount of unequal breaking of the veneer across its grain. The tensile stress on the skin arises from the friction between the surface of the dies and the skin, from friction with the outer veneers, and from the bending of the veneers into valleys of the corrugations. As the veneer is corrugated in the die, its effective width measured along its axis across the grain actually increases by stretching, cracking, and actual separation of fibers. The paper, not being so relieved, is therefore bonded in a state of residual tension.

Pressures required during the pressing cycle are less than those commonly used in making fir plywood because the grains of adjacent wood lamina are not crossed. Pressures from 75 p.s.i. to 150 are recommended, with a reduction in pressure toward the end of the cycle to minimize the over-compression of the assembly and consequent difficulties from grain raising.

The time of the press cycle may vary from about three to ten minutes, depending on the adhesive used and the distance to the nearest glue line.

Examples of technique are as follows:

Example 2

A three-ply veneer laminate was made with stress-skin faces of 90-pound kraft paper. A urea-formaldehyde resin glue mix was used with wheat flour extension. All veneers were ⅛-inch thick Douglas fir with a moisture content of about six percent (6%), oven-dry basis. The outer veneers were spread with glue on both sides, there being four glue lines in the five-ply assembly. The component parts of the assembly were placed together loosely for about three minutes before being placed between the corrugated dies in the press. The press was closed slowly to allow the veneers to crack uniformly due to tensile forces across the grain of the wood and to allow the paper skins to be uniformly tensioned before full pressure application. A pressure of 150 p.s.i. was held for six minutes. The dies were heated by contact with platens heated by 40 p.s.i. steam pressure. The grain of the veneers were all oriented substantially parallel to the corrugations of the dies.

The resultant product was remarkably stiff across the grain due to the stress absorbing paper skin. Sized or resin-treated paper was used with a wet glue application to avoid swelling of the paper skins. Wrinkled paper obviously has a "crepe" effect when acting as a stress-skin. Consequently it will stretch and permit more deflection at a given load than will paper skins which are applied in a state of tension and which retain their tensioned state after removal from the press. The 90-pound (per 1000 sq. ft.) kraft paper has a thickness of .015 to .020 inch. Another appropriate weight would be 78-pound/1000 sq. ft. kraft with a thickness of about .024 inch. This paper has a tensile strength in the machine direction 140-pounds per inch of width and a tensile strength across the machine of 81-pounds per inch of width. Another example is a 96-pound 2-ply laminated kraft .026–7 inch thick. In general the kraft, if used, preferably should be .015–.027 inch in thickness.

Example 3

Another example of technique involved the use of a three-ply veneer center and aluminum foil faces. Again the three veneers were each ⅛ inch thick and the grain was oriented as before. The foil was of "full hard" type and its thickness was 0.005 inch. A urea-formaldehyde glue line was used between adjacent veneers as before, but a commercial resin-based film glue was used between the outer veneer and the aluminum faces. This film was a copolymerized resin of melamine-formaldehyde and polyvinyl acetate. It is especially suited to metal to wood bonding. A six minute press cycle at 150 p.s.i. was used as before with the steam pressure at 40-pounds p.s.i. In closing the press slowly, the friction developed between the steel dies and the aluminum foil, as well as the tendency for the veneer to bend against the foil into the valleys of the corrugations, created appreciable tensile stress in the aluminum foil and assured its intimate contact with the glue film and wood in all parts of its surface. At the time of the setting of the glue lines, the skin was still in a state of tensile stress. The resultant product, therefore, could not be flexed across its corrugations with maximum hand pressure on a 12-inch span. Full hard aluminum foil lacks ductility and will not stretch as a result of prolonged application of tensile stresses.

Example 4

Another laminate was pressed to illustrate the use of other types of adhesives and skin combinations. A three-ply laminate was produced using one lamina of 3/16 inch veneer, with the grain parallel to the die corrugations, and two face skins of a heavy paper made largely from sulphite pulp but being thoroughly treated with uncured phenol-formaldeyhde resin. In addition this paper, which was designed for overlaying plywood, has a dry phenol-formaldehyde resin glue line applied to one surface only. Thus the entire assembly was bonded together with phenolic-type thermosetting, fully waterproof resin. The moisture content must be low enough to avoid steam blisters during the continuous pressing and to avoid excessive flow of the resin into the wood. Eight percent (8%) moisture is generally considered optimum for this type of film adhesive. The pressing period was ten minutes at 40 p.s.i. for steam and a pressure of 200 p.s.i. for five minutes followed by 100 p.s.i. for five minutes. A longer time than before was required to permanently set the glue lines and to complete the cure of the resin in the stress-skin face.

The type of paper used in this example has been found to be virtually weatherproof. Prolonged soaking of the final product does not affect its dimensional stability nor its smooth surface characteristics. The paper has the further advantage of being unusually high in stiffness in its cured state due to the resin in the paper. This property is reflected in lower deflections per unit of load when bending stresses occur across the corrugations.

Example 5

A variation of the last example cited has been pressed in which one or more laminae of ordinary Douglas fir veneer are pressed with resin-treated paper skins with the additional inclusion in the assembly of thin (about 1/24 inch), decorative hardwood veneers to these outer veneer laminae are glued to the outer portion of the paper skin at the same time as the other laminae are being consolidated. Thus, the paper skins must have two glue lines—preferably of the dry film type—and the veneers must be flexible enough and stretchable enough to remain intact during the closing of the press. Most decorative hardwood face veneers in the range of 1/32 inch to 1/20 inch will meet this requirement. The paper skins still account for the stiffness of the resultant laminate across the axis of the ridges and valleys, since the face veneer can absorb very little tensile and compressive stress in this direction. The resultant product, therefore, possesses both decorative and structural properties.

The products of these examples were all tested by manual and simple mechanical application of bending moments comparable to those which the products will have to sustain in use and the tested samples met the tests without breaking or injury.

It is preferred that the wood veneers each have a thickness between 1/10 and 3/16 inch, and that the stress-skins have a thickness between a few thousandths inch (i.e., the example of metal foil at 0.005 inch) and 0.030 inch (i.e. kraft paper) and have a strength of at least 50-pounds per inch of width.

Preferably the ratio of the radius of curvature to veneer thickness is about 10:1 to about 20:1 (i.e., a six-inch wave length with 1 1/4 inch amplitude measured at the center line in the proportions shown in the drawings gives this ratio with the veneer thicknesses cited.

This product has decorative qualities but a principal feature thereof is its structural properties as a building material on a strength-weight it has greater load bearing potentials than other wood laminates. For example, the product panels may be used as a bearing wall without studs or they may be used in a roof with a minimum of rafter or like supports with unsupported spans up to 8 to 10 feet. Other materials, not integral therewith, can be applied to its faces. Such may be roofing, insulation, interior finish, etc., with the product panels forming the principal load bearing structural wall or roof components.

The use of veneer with a maximum of about eight percent (8%) moisture content is important, as above indicated, because of the danger of steam blisters, and because of excessive flow of adhesive material into the wood when high moisture is present. A further reason for the use of this dried veneer is that undried corrugated wet veneer tends not to retain the corrugations in the desired conformation.

While I have shown and described particular embodiments of my invention, it will occur to those skilled in the art that various changes and modifications may be made without departure from the invention, and I therefore aim in the appended claims to cover all such changes and modifications as fall within the true spirit and scope of my invention.

Having thus described my invention, I claim:

1. A corrugated wood laminate, comprising a core of rotary-cut dried wood veneer of a thickness between 1/10 and 3/16 inch curved in a series of sinuous corrugations having a ratio of radius of curvature to veneer thickness of about 10:1 to about 20:1 and extending substantially parallel with the grain of the wood, all of the curves of the sinuous corrugations having been simultaneously formed, the core having been curved in the dry state while having a moisture content of lower than about 8%, curved beyond its ultimate strength of bending crosswise of the corrugations and thereby having a relatively stress-free condition and beyond any substantial tendency to return to its original mechanical integrity across the grain of the wood, and the faces of said core each covered by a stress-skin of sheet material of a thickness between about 0.005 and 0.030 inch and having a tensile strength of at least 50 pounds per inch of width, said stress skins being simultaneously tensed crosswise of the corrugations and simultaneously secured to such faces of said core by an adhesive integrally press-bonding the same in intimate contact therewith, whereby the stress-skins have residual tension stresses as a result of forming the corrugations, said skins being operative to resist bending moment of said core crosswise of the wood grain by reason of having been stressed across the wood laminate while the core was being corrugated and while being bonded thereto.

2. A corrugated wood laminate, comprising a core of rotary-cut dried wood veneer of a thickness between 1/10 and 3/16 inches curved in a series of sinuous corrugations extending substantially parallel with the grain of the wood, all of the curves of the sinuous corrugations having been simultaneously formed, the core having been curved in the dry state while having a moisture content of lower than about 8%, curved beyond its ultimate strength of bending crosswise of the corrugations and thereby having a relatively stress-free condition and beyond any substantial tendency to return to its original mechanical integrity across the grain of the wood, and the faces of said core each covered by a stress-skin of sheet material simultaneously tensed crosswise of the corrugations and simultaneously secured to such faces of said core by an adhesive integrally press-bonding the same in intimate contact therewith, whereby the stress-skins have residual tension stresses as a result of forming the corrugations, said skins being operative to resist bending moment of said core crosswise of the wood grain by reason of having been stressed across the wood laminate while the core was being corrugated and while being bonded thereto.

3. A corrugated wood laminate, comprising a core of rotary-cut dried wood veneer curved in a series of sinuous corrugations extending substantially parallel with the grain of the wood, all of the curves of the sinuous corrugations having been simultaneously formed, the core having been curved in the dry state while having a moisture content of lower than about 8%, curved beyond its ultimate strength of bending crosswise of the corrugations and thereby having a relatively stress-free condition and beyond any substantial tendency to return to its original mechanical integrity across the grain of the wood, and the faces of said core each covered by a stress-skin of sheet material simultaneously tensed crosswise of the corrugations and simultaneously secured to such faces of said core by a hot press resin adhesive integrally press-bonding the same in intimate contact therewith, whereby the stress-skins have residual tension stresses operative to resist bending moment of said core crosswise of the wood grain by reason of having been stressed across the wood laminate while the core was being corrugated and while being bonded thereto.

4. A corrugated wood laminate, comprising a core of a plurality of rotary-cut dried wood veneer juxtaposed sheets with the grain in the sheets substantially parallel and each sheet of a thickness of at least about $\frac{1}{10}$ inch and the sheets having been simultaneously and together curved into a series of sinuous corrugations extending substantially parallel with the grain of the wood, the core having been curved in the dry state while having a moisture content of lower than about 8%, curved beyond its ultimate strength of bending crosswise of the corrugations and thereby having a relatively stress-free condition and beyond any substantial tendency to return to its original mechanical integrity across the grain of the wood, and the faces of said core each covered by a stress-skin of sheet material simultaneously tensed crosswise of the corrugations and simultaneously secured to such faces of said core by an adhesive integrally press-bonding the sheets together and integrally press-bonding the skins in intimate contact with said core faces, whereby the stress-skins have residual tension stresses as a result of forming the corrugations, said skins being operative to resist bending moment of said core crosswise of the wood grain by reason of having been stressed across the wood laminate while the core was being bonded thereto.

5. A corrugated wood laminate, comprising a core of a plurality of juxtaposed rotary-cut dried wood veneer sheets having their grain oriented substantially parallel, each sheet being of a thickness between $\frac{1}{10}$ and $\frac{3}{16}$ inch, said sheets having been simultaneously curved together in a series of sinuous corrugations having a ratio of radius of curvature to veneer thickness of about 10:1 to about 20:1 and extending substantially parallel with the grain of the wood, all of the curves of the sinuous corrugations having been simultaneously formed, the core having been curved in the dry state while having a moisture content of lower than about 8%, curved beyond its ultimate strength of bending crosswise of the corrugations and thereby having a relatively stress-free condition and beyond any substantial tendency to return to its original mechanical integrity across the grain of the wood, and the faces of said core each covered by a stress-skin of sheet material of a thickness between about 0.005 and 0.030 inch and having a tensile strength of at least 50 pounds per inch of width, said stress skins being simultaneously tensed crosswise of the corrugations and simultaneously secured to such faces of said core by an adhesive press-bonding the sheets together and integrally press-bonding the skins in intimate contact with said core faces, whereby the stress-skins have residual tension stresses as a result of forming the corrugations, said skins being operative to resist bending moment of said core crosswise of the wood grain by reason of having been stressed across the wood laminate while the core was being corrugated and while being bonded thereto.

6. A corrugated wood laminate, comprising a core of rotary-cut dried wood veneer of a thickness between $\frac{1}{10}$ and $\frac{3}{16}$ inch curved in a series of sinuous corrugations having a ratio of radius of curvature to veneer thickness of about 10:1 to about 20:1 and extending substantially parallel with the grain of the wood, all of the curves of the sinuous corrugations having been simultaneously formed, the core having been curved in the dry state while having a moisture content of lower than about 8%, curved beyond its ultimate strength of bending crosswise of the corrugations and thereby having a relatively stress-free condition and beyond any substantial tendency to return to its original mechanical integrity across the grain of the wood, and the faces of said core each covered by a stress-skin of sheet material, said stress skins being simultaneously tensed crosswise of the corrugations and simultaneously secured to a face of said core by an adhesive integrally press-bonding the same in intimate contact therewith, whereby the stress-skins have residual tension stresses as a result of forming the corrugations, said skins being operative to resist bending moment of said core crosswise of the wood grain by reason of having been stressed across the full width of the wood laminate while the core was being corrugated and while being bonded thereto, and a decorative wood veneer applied to at least one face of the laminate outside of said skins with the grain of the decorative veneer aligned with the grain of the core veneer and said decorative veneer being integrally press-bonded in place and being of such small thickness as to have no substantial checks and wood separations across the corrugations.

7. A corrugated wood laminate, comprising a core of dried wood veneer curved in a series of sinuous corrugations extending substantially parallel with the grain of the wood, all of the curves of the sinuous corrugations having been simultaneously formed, the core having been curved in the dry state while having a moisture content of lower than about 8%, with the faces of said core each covered by a stress-skin of sheet material simultaneously tensed crosswise of the corrugations and simultaneously secured to such faces of said core by adhesive integrally press-bonding the same in intimate contact therewith, whereby the stress-skins have residual tension stresses operative to resist bending moment of said core crosswise of the wood grain by reason of having been stressed across the wood laminate while the core was being corrugated and while being bonded thereto.

8. The process of forming a corrugated wood laminate, comprising: assembling a flat core unrestrained sheet of rotary cut wood veneer dried to a moisture content of lower than about 8% and a thickness between $\frac{1}{10}$ and $\frac{3}{16}$ inch between a pair of skins of sheet material of a thickness between about 0.005 and 0.030 inch and having a strength of at least 50 pounds per inch of width thereby forming a laminate assembly, interposing between adjacent faces of said core and said skins a thermo-sensitive adhesive, simultaneously corrugating the components of the entire assembly across the grain of the core sheet to provide sinuous corrugations, having a ratio of radius of curvature to veneer thickness about 10:1 to about 20:1 and which are substantially parallel to the grain of said wood and which curve the veneer core severely enough to exceed the ultimate strength in bending of said wood veneer across its grain thereby providing a relatively stress-free condition in the wood crosswise of the grain beyond any substantial tendency to return to its original mechanical integrity across the grain of the wood and beyond substantial resistance to a cross-grain bending moment and at the same time stretching said skins to produce residual tension stresses thereby so that said stress-skins are drawn into intimate contact with said faces to resist substantial bending moments of the laminate crosswise of the wood grain; and heat and pressure bonding the laminated assembly over the entire surface area thereof.

9. The process of forming a corrugated wood laminate, comprising: assembling a dried flat core unrestrained sheet of rotary cut dried wood veneer having a moisture content of lower than about 8% and of a thickness between $\frac{1}{10}$ and $\frac{3}{16}$ inch between face skins of sheet material to form a laminate assembly, interposing between adjacent faces of said core and said skins a thermo-sensitive adhesive, simultaneously corrugating the entire laminate assembly across the grain of the core to form sinuous corrugations which are substantially parallel to the grain of said wood and which curve the veneer severely enough to exceed the ultimate strength in bending of said wood across its grain thereby providing a relatively stress-free condition in wood crosswise of the grain beyond any substantial tendency to return to flat condition and beyond substantial resistance to a cross-grain bending moment and at the same time stretching said skins to produce residual tension stresses thereby so that said stress-skins are drawn into intimate contact with said faces to resist substantial bending moments of said core crosswise of the wood grain; and heat and pressure bonding the laminated assembly over the entire surface area thereof.

10. The process of forming a corrugated wood laminate, comprising: assembling a flat core formed of a plurality of rotary cut wood veneers dried to a moisture content of lower than about 8% and each of a thickness of at least 1/10 inch and juxtaposed with the wood grains thereof substantially parallel, covering the faces of said core with skins of sheet material having a strength of at least 50 pounds per inch of width thereby forming a laminate assembly, interposing between adjacent faces of said core and said skins and between the veneers of said core a thermo-sensitive adhesive, simultaneously corrugating the laminate assembly across the grain of the core to form sinuous corrugations which are substantially parallel to the grain of said wood and which curve the veneer core severely enough to exceed the ultimate strength in bending of said wood across its grain thereby providing a relatively stress-free condition in the wood crosswise of the grain beyond any substantial tendency to return to flat condition and beyond substantial resistance to a cross-grain bending moment of the veneers and at the same time stretching said skins to produce residual tension stresses thereby so that said stress-skins are drawn into intimate contact with said faces to resist substantial bending moments of the laminate crosswise of the wood grain; and heat and pressure bonding the laminated assembly over the entire surface area thereof.

11. The process of forming a corrugated wood laminate, comprising: assembling a flat core formed of rotary cut wood veneer dried to a moisture content of lower than about 8% moisture content and of a thickness between 1/10 and 3/16 inch between a pair of skins of sheet material of a thickness between about 0.005 and 0.030 inch and having a strength of at least 50 pounds per inch of width, and covering at least one of said skins with a decorative wood veneer of such small thickness as to have no substantial checking and separation of the wood during corrugating and with the decorative veneer grain substantially parallel to the core veneer grain, thereby forming a laminate assembly, interposing between adjacent faces of said core and said skins and between said decorative veneer and the adjacent skin surface a thermo-sensitive adhesive, simultaneously corrugating the assembly across the grain of the core and curving the core veneer severely enough to exceed the ultimate strength in bending of said core wood across its grain thereby providing a relatively stress-free condition in the core wood crosswise of the grain beyond any substantial tendency to return to flat condition and beyond substantial resistance to a cross-grain bending moment and at the same time stretching said skins to the wood corrugations to produce residual tension stresses thereby so that said stress-skins are drawn into intimate contact with said faces to resist substantial bending moments of said core crosswise of the wood grain; and heat and pressure bonding the laminated assembly over the entire surface area thereof.

12. The process of forming a corrugated wood laminate, comprising: assembling a dried flat core unrestrained sheet of cut and dried wood veneer having a moisture content of lower than about 8% between face skins of sheet material to form a laminate assembly, interposing between adjacent faces of said core and said skins an adhesive, simultaneously corrugating the entire laminate assembly across the grain of the core to form sinuous corrugations which are substantially parallel to the grain of said wood and at the same time stretching said skins to produce residual tension stresses thereby so that said stress-skins are drawn into intimate contact with said faces to resist substantial bending moments of said core crosswise of the wood grain; and press bonding the laminated assembly over the entire surface area thereof.

References Cited in the file of this patent

UNITED STATES PATENTS

| | | |
|---|---|---|
| 2,397,388 | Troedsson | Mar. 26, 1946 |
| 2,442,422 | Loetscher | June 1, 1948 |
| 2,545,603 | Byers et al. | Mar. 20, 1951 |
| 2,640,517 | Mello | June 2, 1953 |
| 2,764,193 | Knowles | Sept. 25, 1956 |

OTHER REFERENCES

Ser. No. 185,492, Franke (A.P.C.), published April 27, 1943.

Ser. No. 398,008, Franke (A.P.C.), published May 11, 1943.